United States Patent Office 3,328,323
Patented June 27, 1967

3,328,323
ORGANOPOLYSILOXANE COPOLYMERS CONTAINING POLYDIARYLSILOXANE BLOCKS AND A PROCESS FOR MAKING THEM
Howard A. Vaughn, Jr., Scotia, N.Y., assignor to General Electric Company, a corporation of New York
No Drawing. Filed Feb. 4, 1963, Ser. No. 256,136
12 Claims. (Cl. 260—18)

The present invention relates to novel organopolysiloxane copolymers containing polydiarylsiloxane blocks and to a process for making them. More particularly, the present invention relates to a process for reacting silanol-stopped polydiarylsiloxanes with various polydiorganosiloxanes having reactive chain-stopping radicals, and to the copolymers produced thereby.

The block copolymers of the present invention consist essentially of from 10 to 90% by weight of polydiarylsiloxane blocks having the formula, (1)
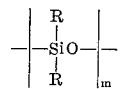

chemically combined with from 90% to 10% by weight of polydiorganosiloxane blocks having the formula, (2)
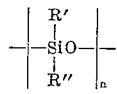

where R is a member selected from monovalent aryl radicals, and halogenated monovalent aryl radicals, R′ is a member selected from monovalent aliphatic radicals, and halogenated monovalent aliphatic radicals, R″ is a member selected from monovalent hydrocarbon radicals and halogenated monovalent hydrocarbon radicals, and cyanoalkyl radicals, $m$ is equal to from 5 to about 500, inclusive, and $n$ is equal to from about 5 to about 1,000, inclusive.

The copolymers of the present invention can be made by a method which comprise (1) forming a mixture comprising (A), 100 parts of a polydiarylsiloxane having the formula, (3)
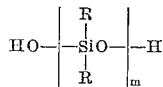

and (B), 11 to 900 parts of a polydiorganosiloxane selected from
  (a) a silanol-stopped polydiorganosiloxane having the formula, (4)
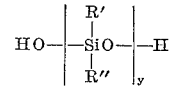

and (b), a halogen chain-stopped polydiorganosiloxane having the formula, (5)
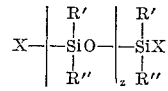

(2) effecting reaction between (A) and (B) at a temperature between 0° C. to 175° C., and (3) recovering from (2) a reaction product of (A) and (B) where R, R′, R″ and $m$ are as defined above, X is a member selected from a chlorine radical and bromine radical, $y$ is the same as $n$ defined above, and $z$ is equal to from 5 to 200 inclusive.

Radicals included by R of Formulae 1 and 2 are aryl radicals such as phenyl, chlorophenyl, xylyl, tolyl, naphthyl, etc. Radicals included by R′ of Formulae 2, 4 and 5 are aliphatic, haloaliphatic and cycloaliphatic radicals such as alkyl, alkenyl, cycloalkyl, haloalkyl, including methyl, ethyl, propyl, chlorobutyl, cyclohexyl, etc. Radicals included by R″ of Formulae 2, 4 and 5 are all of the above-mentioned radicals included by R of Formula 1 and R′ of Formula 2. In addition, R″ includes aralkyl radicals such as phenylethyl, benzyl, etc.; and cyanoalkyl radicals such as cyanoethyl, cyanopropyl, cyanobutyl, etc. R, R′ and R″ respectively, can be all the same radical or any two or more of the aforementioned R, R′ and R″ radicals. R is preferably phenyl, R′ is preferably methyl, and R″ is preferably methyl or phenyl.

Although arylsiloxane-alkylsiloxane copolymers can be rigid, moldable materials, or extrudable, rubbery solids, the size of the blocks can have an important bearing on the tensile strength and thermal stability of the copolymer. It has been found by those skilled in the art, for example, that blocks of three units or less in a copolymer can often lower its melting point. In addition, such small blocks are often not large enough to form crystallites, or interact with blocks in adjacent chains to improve tensile strength. The method of the present invention, however, provides for the production of block copolymers having chemically combined blocks of a predetermined size and weight proportions. Chemically combined blocks of at least five siloxy units provide for improved tensile strength and thermal stability.

Depending upon the relative weight proportions in the copolymers of the present invention of the polydiarylsiloxane block as compared to the polydiorganosiloxane block, the properties of the copolymer will vary widely. For example, a copolymer containing from about 90% by weight, to 70% by weight of the polydiarylsiloxane block will be a rigid material which can be utilized in molding applications. A copolymer containing less than about 60% by weight of the polydiarylsiloxane block and as little as 10% by weight thereof, can be utilized for making organopolysiloxane elastomers having improved tensile strength. Preferably, the elastomeric forming copolymers of the invention have from 25% to 50% by weight of the polydiarylsiloxane blocks.

The polydiarylsiloxane blocks utilized in the practice of the invention can be prepared by effecting reaction between diarylsilanediol molecules of the formula, (6)
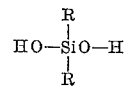

where R is as defined above in accordance with various procedures. A preferred method for example, is to effect reaction between diarylsilanediol molecules, such as diphenylsilanediol in accordance with the teaching of copending application Ser. No. 256,137, filed Feb. 4, 1963, now abandoned, of H. A. Vaughn, Jr., by use of a metal soap catalyst, which also can be utilized as described below, in the method of the present invention. A dispersed phase of the catalyst is formed in the diarylsilanediol preferably using an organic solvent. The mixture is then heated to a temperature of between about 50° C. to 225° C. to effect reaction of the diarylsilanediol. Depending upon the temperature and length of time utilized in heating the dispersed phase, the chain length of the polymer can vary widely. For example, if the aforementioned polymeric reaction product is heated further to a temperature of 200° C., or higher under reduced pressure, its molecular weight will be increased further. It has been found that polymers having a chain length of from 5 to 500 diarylsiloxy units are operable. In order to avoid the formation of polymers having too high a molecular weight, i.e., substantially above 500 units, the formation of chains by Vaughn's method having an average of from 5 to 250 units can be utilized. Another method that can be employed to form the diarylsiloxane of Formula 3 is shown in F. S. Kipping et al., J. Chem. Soc. (1928) pp. 1427 to 1431. A further method that can be employed, particularly where polydiarylsiloxanes are desired having as little as 5 or more chemically combined diarylsiloxy units, is the method utilized by C. A. Burkhard, J. Chem. Soc., vol. 67, p. 2173, involving the partial hydrolysis of the corresponding diaryldihalosilane. The final product can be recovered from the resulting hydrolyzate by means of fractional recrystallization.

The polydiorganosiloxanes of Formula 4 are well known in the art and can be made by any one of several well known methods. For example, one method is to treat a highly viscous polydiorganosiloxane gum, for example, a polydimethylsiloxane gum with water. These highly viscous polydiorganosiloxane polymers can be made in accordance with procedures taught in E. G. Rochow, "Chemistry of the Silicones," (2nd Edition) John Wiley and Sons, New York, N.Y., by hydrolyzing the corresponding diorganodihalosilane in water, and thereafter effecting the condensation of the respective diorganosiloxy units with acidic or alkaline catalysts. Another procedure is by equilibrating a cyclic polydiorganosiloxane such as octamethylcyclotetrasiloxane with an alkali hydroxide. Steam can be blown across the surface of the resulting gum, or a mixture of water and gum can be heated to elevated temperatures, for example, 150 to 170° C. to reduce the viscosity of the polymer to a range of from 10 to 100,000 centipoises. Preferably, $y$ in the silanol-stopped polydiorganosiloxane of Formula 4 has an average value of from 20 to 600.

The halogen chain-stopped polydiorganosiloxane polymers of Formula 5 can be made by conventional procedures, such as by the controlled hydrolysis of a diorganodihalosilane, for example, dimethyldichlorosilane as taught in Patnode Patent 2,381,366 and Hyde Patents 2,629,726 and 2,902,507. Other procedures are shown in Sauer Patent 2,421,653 involving the equilibration of a mixture of a suitable diorganodihalosilane and a cyclic polydiorganosiloxane. It has been found desirable in the preparation of the halogen chain-stopped polydiorganosiloxane of Formula 5, to maintain the halogen content of the resulting halogenated polysiloxane in the range of about 0.4 to about 15% by weight and preferably from about 1 to about 6 percent, by weight of the halogenated polysiloxane. Preferably, $z$ in the halogen-stopped polydiorganosiloxanes of Formula 5 has an average value of from 15 to 100.

In forming the block copolymers of the present invention, the polydiarylsiloxane of Formula 3 referred to hereinafter as the "aryl siloxane" can be reacted with either the silanol-stopped polydiorganosiloxane of Formula 4 referred to hereinafter as the "silanol-stopped siloxane," or the aryl siloxane can be reacted with the halogen-stopped polydiorganosiloxane of Formula 5 referred to hereinafter as the "halogen-stopped siloxane."

In forming the block copolymer the metal soap catalyst can be employed to effect the chemical combination of the arylsiloxane and the silanol-stopped siloxane. Any of the metal soap catalysts of copending application Ser. No. 256,137, filed Feb. 4, 1963 of H. A. Vaughn, Jr., assigned to the same assignee as the present invention, can be employed. For example, there can be utilized, stannous octoate, tin naphthenate, zinc oleate, etc. One procedure that can be utilized for example, is to form a solution of the arylsiloxane and the silanol-stopped siloxane in a suitable organic solvent to which a metal soap such as stannous octate is added. A suitable organic solvent is substantially inert to the components during the reaction. Suitable organic solvents that can be employed, for example, are chlorobenzene, toluene, xylene, etc.

Temperatures at which the reaction between the arylsiloxane and the silanol-stopped siloxane can be effected are preferably from about 80° C. to 150° C., depending upon the solubility characteristics of the components in the particular solvent utilized and the nature of the components that are to be reacted, that is, their viscosity, molecular weight, etc. The proportion of metal soap catalyst that can be effectively utilized is an amount sufficient to provide from about .025% to 2% of metal ion based on the combined weight of the arylsiloxane and the silanol-stopped siloxane, while a preferred range is 0.1% to 1% by weight of metal ion. Reaction times can vary widely depending upon the temperature employed, amount of catalyst, components utilized, etc. The copolymer can be advantageously separated from the reaction mixture by allowing the mixture to cool to room temperatures and precipitating the copolymer from the mixture. A low molecular weight aliphatic alcohol, such as methanol, ethanol, etc. can be utilized by adding it to the mixture. The product that separates from the mixture can be treated further, with the alcohol, if desired.

The alternative method of making the copolymers of the present invention is by effecting reaction between the arylsiloxane and the halogen-stopped siloxane in a manner somewhat similar to that utilized with the silanol-stopped siloxane. Instead of utilizing a metal soap catalyst however, an acid acceptor is employed. It has been found that advantageous results are achieved if an amount of acid acceptor is utilized that is sufficient to provide for at least about one mole of acid acceptor for each mole of hydrolyzable halogen present in the mixture of halogen-stopped siloxane and arylsiloxane. Excess amounts of acid acceptor, i.e., at least a ratio of about two moles of acid acceptor per mole of hydrolyzable halogen can also be advantageously employed.

Although the order of addition of the reactants is not critical, it has been found expedient to add the halogen-stopped siloxane to a mixture of the acid acceptor and the arylsiloxane. Organic solvents, as described previously with respect to forming the copolymer by the use of the silanol-stopped siloxane can be employed. In addition, acid acceptors that can be utilized are for example, pyridine, aniline, triethylamine, and materials such as ammonia, etc.

Temperatures that can be utilized in the reaction between the halogen chain-stopped siloxane and the arylsiloxane can vary widely depending upon such factors as the solvent employed, etc. Temperatures can vary therefore from 0° C. to as high as the boiling points of the components of the mixture, such as the solvent and acid acceptor utilized.

The separation of the copolymer can be achieved by allowing the mixture to cool, and separating out from the mixture by filtrating, washing with water, etc., any residues such as amine, salts, etc.; the precipitation of the copolymer can be achieved by conventional means such as introducing a lower aliphatic alcohol to the mixture. The copolymer then can be further treated as previously described to effect the separation of lower molecular weight materials.

In order that those skilled in the art will be better able to practice the invention, the following examples are given by way of illustration and not by way of limitation. All parts are by weight.

*Example 1*

An arylsiloxane in the form of a silanol chain-stopped polydiphenylsiloxane was prepared as follows:

To a mixture of 6½ parts of diphenylsilanediol and 4 parts of methanol, there was added .08 part of stannous octoate. After the mixture was stirred, the methanol was removed under reduced pressure. The resulting product was then heated in an oven at a temperature of about 150° C. for 30 hours. The product was then dissolved in boiling chlorobenzene and recrystallized. It was found to be insoluble in boiling toluene at atmospheric conditions. The molecular weight of the product was determined by Zerewitinoff analysis of silanol end groups; its molecular weight was about 34,000. Based on its molecular weight, method of preparation and infrared spectrum, the product was a phenylsiloxane having the average formula,

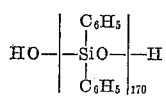

$$HO-\left[-\underset{\underset{C_6H_5}{|}}{\overset{\overset{C_6H_5}{|}}{Si}O}-\right]_{170}-H$$

To a mixture of 45 parts of the above-described phenylsiloxane and 500 parts of dry chlorobenzene, there were added 15 parts of a silanol-stopped methylsiloxane in the form of a silanol-stopped polydimethylsiloxane having a viscosity of about 3,000 centipoises and a silanol content of 0.09 percent by weight, based on the weight of methylsiloxane. The silanol-stopped methylsiloxane was prepared as follows:

Increments of water were added to a soft polydimethylsiloxane gum over a 2 to 5 hour period, at a temperature of between about 150° C. to 160° C. The water was added in controlled amounts until the mixture achieved a viscosity of about 3,000 centipoises. The mixture was then stripped under reduced pressure. Based on method of preparation and its viscosity, the product was a silanol-stopped methylsiloxane having the average formula,

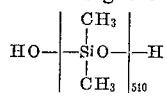

$$HO-\left[-\underset{\underset{CH_3}{|}}{\overset{\overset{CH_3}{|}}{Si}O}-\right]_{510}-H$$

There was added to the above-described chlorobenzene mixture of the phenylsiloxane and silanol-stopped methylsiloxane, 0.5% by weight of tin in the form of stannous octoate. The mixture was heated to reflux for about 40 hours. The mixture was allowed to cool down to room temperature. A product was precipitated from the mixture by adding methanol to it. The product was recovered, washed with more methanol and dried at 100° C. There were recovered 54 parts of product. The product was completely soluble in chlorobenzene at 25° C., although the phenylsiloxane initially utilized was substantially insoluble. The infrared spectrum of the product showed a band at 11.87 indicating a copolymeric structure. The product was pressed in a hot mold and a rigid plastic sheet was obtained. Based on method of preparation and the aforementioned experimental evidence, the product was a copolymer composed of about 75% by weight of phenylsiloxane blocks having the average formula

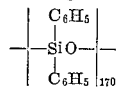

chemically combined with 25% by weight of methylsiloxane blocks having the average formula

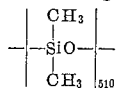

In addition to the above-described copolymer, other products were prepared following the same procedure. Product A was formed by reacting an equal weight proportion of the above phenylsiloxane and silanol-stopped methylsiloxane. Product B was formed by reacting 45 parts of the silanol-stopped methylsiloxane and 15 parts of the diphenylsiloxane. The products were found to be rubbery materials. Infrared also confirmed the fact that the products were copolymers.

Based on method of preparation and experimental evidence, copolymer A was composed of an equal weight proportion of chemically combined arlysiloxane blocks having the average formula

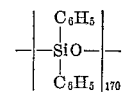

and methylsiloxane blocks having the average formula

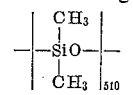

Copolymer B was composed of 75% by weight of methylsiloxane blocks having the average formula

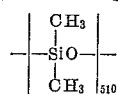

chemically combined with 25% by weight of phenylsiloxane blocks having the average formula

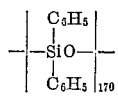

A mixture of copolymer A and fume silica was milled on a rubber mill in a proportion of 100 parts of copolymer and 40 parts of fume silica. There was added to the mixture 3 parts of benzoyl peroxide per 100 parts of polymer. Slabs were formed which were press-cured at 140° C. to form a highly resilient elastomer having a tensile strength of about 400 p.s.i. and an elongation of 40 to 75%. Similar results were obtained from press-cured slabs of copolymer B made by the same procedure.

*Example 2*

A halogen-stopped methylsiloxane in the form of a chlorine chain-stopped polydimethylsiloxane is made as follows:

Into a vessel containing 800 parts of dimethyldichlorosilane there is added over a 2 hour period, a mixture of 100 parts of water and 206 parts of dioxane. The resulting mixture is heated to a gentle reflux with stirring until it has become homogenous. The mixture is stripped in vacuo to a pot temperature of 202° C. at 12 mm. pressure. The stripped hydrolyzate is then filtered to yield 323 parts of a clear oil. The oil is titrated with a standard silver nitrate solution and it is found to have about 4.9% of hydrolyzable chlorine. Based on method of preparation and the aforementioned analysis the oil has the average formula $$Cl\left[\underset{\underset{CH_3}{|}}{\overset{\overset{CH_3}{|}}{Si}O}-\right]_{18}-\underset{\underset{CH_3}{|}}{\overset{\overset{CH_3}{|}}{Si}}Cl$$

There is added to a mixture of 68 parts of a phenylsiloxane and 4 parts of pyridine in dry chlorobenzene, 15 parts of the above-halogen-stopped methylsiloxane. The phenylsiloxane that is utilized is made in accordance with the procedure of Example 1. It is found to have 0.5 weight per cent silanol by a Zerewitinoff determination.

The above mixture is heated to a temperature of about 75° C. for 2 hours. The mixture is then allowed to cool at room temperature and methanol is added. A product is precipitated which is recovered by filtration. The product is further washed with methanol. It is dried at 100° C. Infrared shows that it has a copolymeric structure. The product is found to be a strong, thermoplastic material. Based on method of preparation and experimental data, the product is a copolymer of 17% by weight of methyl siloxane blocks having the average formula $$-\left[-\underset{\underset{CH_3}{|}}{\overset{\overset{CH_3}{|}}{Si}O}-\right]_{18}-$$

chemically combined with 83% by weight of phenylsiloxane blocks having the average formula $$-\left[-\underset{\underset{C_6H_5}{|}}{\overset{\overset{C_6H_5}{|}}{Si}O}-\right]_{34}-$$

*Example 3*

An arylsiloxane block in the form of a pentamer diol is prepared by the previously described procedure of Burkhard. Di-p-tolyldichlorosilane is hydrolyzed by adding it to a water-ether solution resulting in the production of a hydrolysis mixture containing a mole ratio of 2 moles of di-p-tolyldichlorosilane to 1 mole of water. The mixture is stirred constantly during the addition of the di-p-tolyldichlorosilane. After the addition is completed, the ether is removed and the mixture is heated to a temperature of 250° C. at a pressure of 1 mm. A residue is obtained which is totally hydrolyzed in an ether-water hydrolysis mixture having a ratio of 5 moles of water per mole of ether. The hydrolyzate is recovered and dried in an oven at 110° C. for 10 hours. The dried product is repeatedly recrystallized in a hexane-toluene mixture. A product is obtained having a silanol content of about 3.0% by the Zerewitinoff method. The product is deca-p-tolylpentasiloxane-1,5-diol.

A methylsiloxane in the form of a silanol-stopped polydimethylsiloxane is prepared by adding to 400 parts of dimethyldichlorosilane, 50 parts of water and 103 parts of dioxane while the resulting mixture is stirred. During the addition, the temperature is maintained at about 0° C. The mixture is allowed to separate and the top, oily layer is stripped to a temperature of 210° C. The residue is mixed with 50 parts of acetone and added slowly to 75 parts of sodium bicarbonate and 100 parts of acetone. The resulting mixture is stirred for 30 minutes at 10° C. and filtered. There is recovered 164 parts of a silanol chain-stopped polydimethylsiloxane having a viscosity of about 40 centipoises, and a silanol content of about 1.4% as determined by the Zerewitinoff method.

Based on its viscosity and its silanol content the polydimethylsiloxane has the average formula,

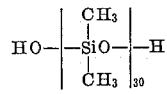

There is added 0.12 part of lead octoate to a mixture of 34 parts of the above silanol-stopped polydimethylsiloxane, 16 parts of the above-described deca-p-tolyl-pentasiloxane-1,5-diol, and 450 parts of benzene. The mixture is heated at a gentle reflux for a period of about 24 hours. The mixture is then allowed to cool to room temperature and methanol is added to the mixture until no more product is precipitated. The product is then filtered from the mixture and treated further with boiling methanol. After drying at 100° C., there is obtained a rubbery product. Infrared shows that it is copolymeric. Based on method of preparation and experimental data, the product is a copolymer composed 32% by weight of a p-tolylsiloxane block having the formula

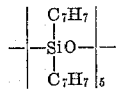

chemically combined with 68% by weight of a methylsiloxane block having the average formula

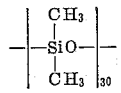

There is added 40 parts of fume silica filler and about 3 parts of benzoyl peroxide to 100 parts of the above copolymer while it is milled on a rubber mill. The resulting blend is then formed into a sheet from which slabs are cut. These slabs are press-cured at a temperature of about 140° C. to a highly resilient elastomer having outstanding tensile strength.

While the foregoing examples have of necessity been limited to only a few of the very many variables within the scope of the present invention, it should be understood that the present invention covers a broad class of polyarylsiloxane-polyorganosiloxane block copolymers which are produced by reacting a polydiarylsiloxane of Formula 3 and a polydiorganosiloxane of Formula 4 or 5.

The examples have of necessity been directed to only a few of the many process variables which are practicable in the process of the present invention. It should be understood, however, that the process of the present invention is illustrated by both the specific examples given as well as by the detailed description of the present invention which preceded these examples.

What I claim as new and desire to secure by Letters Patent of the United States is:

1. Block copolymers consisting essentially of from 10% to 90% by weight of polydiarylsiloxane blocks having the formula,

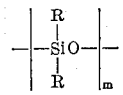

chemically combined with from 90% to 10% by weight of polydiorganosiloxane blocks having the formula,

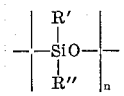

where R is a member selected from the class consisting of monovalent aryl radicals and halogenated monovalent aryl radicals, R' is a member selected from the class consisting of monovalent aliphatic radicals and halogenated monovalent aliphatic radicals, and R'' is a member selected from the class consisting of monovalent hydrocarbon radicals, halogenated monovalent hydrocarbon radicals, and cyanoalkyl radicals, $m$ is equal to from 5 to 500, inclusive, and $n$ is equal to from 5 to 1,000, inclusive.

2. A block copolymer in accordance with claim 1 consisting essentially of chemically combined polydiphenylsiloxane blocks and polydimethylsiloxane blocks.

3. A rubbery block copolymer in accordance with claim 1.

4. A rigid moldable block copolymer in accordance with claim 1.

5. A method for making block copolymers comprising (1) forming a mixture comprising (A) 100 parts of a polydiarylsiloxane having the formula,

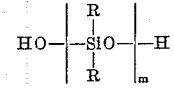

and (B) 11 to 900 parts of a polydiorganosiloxane selected from the class consisting of (a) a silanol-stopped polydiorganosiloxane having the formula,

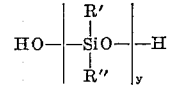

and (b) a halogen chain-stopped polydiorganosiloxane having the formula,

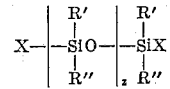

(2) effecting reaction between (A) and (B) at a temperature between 0° C. to 175° C., and (3), recovering from (2) a block copolymer reaction product of (A) and (B), where R is a member selected from the class consisting of monovalent aryl radicals and halogenated monovalent aryl radicals, R' is a member selected from the class consisting of monovalent aliphatic radicals and halogenated monovalent aliphatic radical, and R'' is a member selected from the class consisting of monovalent hydrocarbon radicals, halogenated monovalent hydrocarbon radicals, and cyanoalkyl radicals, $m$ is equal to from 5 to 500, inclusive, $y$ is equal to from 5 to 1,000, inclusive, $z$ is equal to from 5 to 200, inclusive, and X is a member selected from the class consisting of a chlorine radical and a bromine radical.

6. A method for making block copolymers comprising (1) forming a mixture comprising (A) 100 parts of a polydiarylsiloxane having the formula,

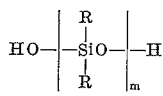

and (B) 11 to 900 parts of a polydiorganosiloxane having the formula,

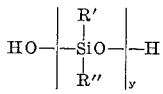

(2) effecting reaction between (A) and (B) at a temperature between 0° C. to 175° C., and (3), recovering from (2) a block copolymer reaction product of (A) and (B), where R is a member selected from the class consisting of monovalent aryl radicals and halogenated monovalent aryl radicals, R' is a member selected from the class consisting of monovalent aliphatic radicals and halogenated monovalent aliphatic radicals, R'' is a member selected from the class consisting of monovalent hydrocarbon radicals, halogenated monovalent hydrocarbon radicals and cyanoalkyl radicals, $m$ is equal to from 5 to 500, inclusive, and $y$ is equal to from 5 to 1,000, inclusive.

7. A method in accordance with claim 6 where the polydiarylsiloxane is a polydiphenylsiloxane, and the polydiorganosiloxane is a silanol-stopped polydimethylsiloxane.

8. A method in accordance with claim 6 where the mixture contains .025% to 2% by weight of metal in the form of a metal soap, based on the weight of the polydiarylsiloxane and the polydiorganosiloxane.

9. A method in accordance with claim 8 where the metal soap is stannous octoate.

10. A method for making block copolymers comprising (1) a mixture comprising (A) 100 parts of polydiarylsiloxane having the formula,

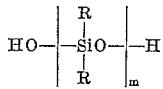

and (B) 11 to 900 parts of a polydiorganosiloxane having the formula,

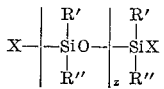

(2) effecting reaction between (A) and (B) at a temperature between 0° C. to 175° C., and (3) recovering from (2) a block copolymer reaction product of (A) and (B) where R is a member selected from the class consisting of monovalent aryl radicals and halogenated monovalent aryl radicals, R' is a member selected from the class consisting of monovalent aliphatic radicals and halogenated monovalent aliphatic radicals, and R'' is a member selected from the class consisting of monovalent hydrocarbon radicals, halogenated monovalent hydrocarbon radicals, and cyanoalkyl radicals, $m$ is equal to from 5 to 500, inclusive, $z$ is equal to from 5 to 200, inclusive, and X is a member selected from the class consisting of a chlorine radical and a bromine radical.

11. A method in accordance with claim 10 where the mixture contains pyridine as an acid acceptor.

12. A method in accordance with claim 10 where the polydiarylsiloxane is a polydiphenylsiloxane and the halogen chain-stopped polydiorganosiloxane is a chlorine chain-stopped polydimethylsiloxane.

References Cited
UNITED STATES PATENTS

| | | | |
|---|---|---|---|
| 2,843,555 | 7/1958 | Berridge | 260—825 |
| 2,868,766 | 1/1959 | Johannson | 260—46.5 |
| 2,991,266 | 7/1961 | Bluestein et al. | 260—825 |
| 2,994,684 | 8/1961 | Johannson | 260—46.5 |
| 3,027,344 | 3/1962 | Gabicki et al. | 260—46.5 |
| 3,114,721 | 12/1963 | Bobear | 260—46.5 |

FOREIGN PATENTS

| | | |
|---|---|---|
| 638,116 | 3/1962 | Canada. |

DONALD E. CZAJA, *Primary Examiner.*

LEON J. BERCOVITZ, *Examiner.*

R. W. GRIFFIN, *Assistant Examiner.*